(12) United States Patent
Agarwal et al.

(10) Patent No.: US 7,953,676 B2
(45) Date of Patent: May 31, 2011

(54) PREDICTIVE DISCRETE LATENT FACTOR MODELS FOR LARGE SCALE DYADIC DATA

(75) Inventors: Deepak Agarwal, San Jose, CA (US); Srujana Merugu, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 953 days.

(21) Appl. No.: 11/841,093

(22) Filed: Aug. 20, 2007

(65) Prior Publication Data

US 2009/0055139 A1    Feb. 26, 2009

(51) Int. Cl.
    *G06F 15/18*    (2006.01)
(52) U.S. Cl. .......................................... 706/12
(58) Field of Classification Search .................... 706/12; 703/2
    See application file for complete search history.

(56) References Cited

OTHER PUBLICATIONS

G. Adomavicius and A. Tuzhilin, Towards the Next Generation of Recommender Systems: A Survey of the State-of-the-Art and Possible Extensions, IEEE Transactions on Knowledge and Data Engineering, vol. 17, Is. 6 (2005).*

Bin Gao et al., Int'l Conf. on Knowledge Discovery and Data Mining, 2005, pp. 41-50.*

Banerjee, Arindam, et al., "A Generalized Maximum Entropy Approach to Bregman Co-clustering and Matrix Approximation," SIGKDD '04, 10 pages.

Banerjee, Arindam, et al., "Clustering with Bregman Divergences," 6 *Journal of Medicine Learning Research* 1-48 (2005).

Chakrabarti, Deepayan, et al., "Fully Automatic Cross-Associations," KDD '04, Seattle, Washington, USA, 10 pages (Aug. 22-24, 2004).

Chickering, David M., et al., "Goal-Oriented Clustering," Technical Report MSR-TR-2000-82, Microsoft, Redmond, WA, 7 pages (2000).

Dhillon, Iderjit S., et al., "Information-Theoretic Co-clustering," SIGKDD '03, Washington, DC, USA, 10 pages (Aug. 24-27, 2003).

Fernández, Carmen, et al., "Modelling Spatially Correlated Data Via Mixtures: A Bayesian Approach," 31 pages (Jan. 2002).

Gunawardana, Asela, et al., "Convergence Theorems for Generalized Alternating Minimization Procedures," 6 *Journal of Machine Learning Research* 2049-2073 (2005).

Hoff, Peter D., "Bilinear Mixed Effects Models for Dyadic Data," Working Paper No. 32, Center for Statistics and the Social Sicences, University of Washington, 21 pages (Jul. 3, 2003).

(Continued)

*Primary Examiner* — Donald Sparks
*Assistant Examiner* — Vincent M Gonzales
(74) *Attorney, Agent, or Firm* — Nathan O. Greene; Brinks Hofer Gilson & Lione

(57) ABSTRACT

A method for predicting future responses from large sets of dyadic data includes measuring a dyadic response variable associated with a dyad from two different sets of data; measuring a vector of covariates that captures the characteristics of the dyad; determining one or more latent, unmeasured characteristics that are not determined by the vector of covariates and which induce local structures in a dyadic space defined by the two different sets of data; and modeling a predictive response of the measurements as a function of both the vector of covariates and the one or more latent characteristics, wherein modeling includes employing a combination of regression and matrix co-clustering techniques, and wherein the one or more latent characteristics provide a smoothing effect to the function that produces a more accurate and interpretable predictive model of the dyadic space that predicts future dyadic interaction based on the two different sets of data.

26 Claims, 5 Drawing Sheets

Initialize with arbitrary latent variable assignments $\tilde{p}$
Repeat
  Generalized E-Step
    Step 1: Update Priors: $\forall [I]_1^k, [J]_1^l$,
    $$\pi_{IJ} \leftarrow \sum_{ij} p_{ij} \tilde{p}(I|i)\tilde{p}(J|j)$$
    Step 2: Update Interaction Effects: $\forall [I]_1^k, [J]_1^l$,
    $$\delta_{IJ} \leftarrow \underset{\delta}{\text{argmax}} \sum_{ij} w_{ij} \sum_{IJ} \tilde{p}(I|i)\tilde{p}(J|j) \, (y_{ij}\delta_{IJ} - \psi(\beta^t x_{ij} + \delta_{IJ}))$$
    Step 3: Update Regression Coefficients:
    $$\beta \leftarrow \underset{\beta}{\text{argmax}} \sum_{ij} w_{ij} \sum_{IJ} \tilde{p}(I|i)\tilde{p}(J|j) \, (y_{ij}\beta^t x_{ij} - \psi(\beta^t x_{ij} + \delta_{IJ}))$$
  Generalized E-Step
    Step 4: Update Row Cluster Assignments: $\forall [i]_1^m, [I]_1^k$,
    $$\tilde{p}(I|i) \leftarrow c_i \left( \prod_{i,j} (\pi_{IJ} f_{\psi}(y_{ij}, \beta^t x_{ij} + \delta_{IJ}))^{w_{ij} \tilde{p}(J|j)} \right)^{\frac{1}{w_i}}$$
    where $c_i$ is a normalizing factor s.t. $\sum_I \tilde{p}(I|i) = 1$ and $w_i = \sum_j w_{ij}$.
    Step 4: Update Column Cluster Assignments: $\forall [j]_1^n, [J]_1^l$,
    $$\tilde{p}(J|j) \leftarrow c_j \left( \prod_{i,j} (\pi_{IJ} f_{\psi}(y_{ij}, \beta^t x_{ij} + \delta_{IJ}))^{w_{ij} \tilde{p}(I|i)} \right)^{\frac{1}{w_j}}$$
    where $c_j$ is a normalizing factor s.t. $\sum_J \tilde{p}(J|j) = 1$ and $w_j = \sum_i w_{ij}$.
until convergence
return $(\beta, \Delta, \Pi, \tilde{p})$

OTHER PUBLICATIONS

Hofmann, Thomas, "Probabilistic Latent Semantic Analysis," *Uncertainity in Artificial Intelligence*, UAI '99, Stockholm, 8 pages.

Langford, Ian H., et al., "Multilevel Modelling of the Geographical Distributions of Diseases," 48, Part 2, *Appl. Statist*. 253-268 (1999).

Lee, Daniel D., et al., "Algorithms for Non-negative Matrix Factorization," NIPS 2001; 13:556-562.

Long, Bo, et al., "Unsupervised Learning on K-partite Graphs," KDD '06, Philadelphia, Pennsylvania, USA, pp. 317-326 (Aug. 20-23, 2006).

Madeira, Sara C., et al., "Biclustering Algorithms for Biological Data Analysis: A Survey," INESC-ID TEC. REP. Jan. 2004, pp. 1-31 (Jan. 2004).

Neal, Radford M., et al., "A New View of the EM Algorithm that Justifies Incremental and Other Variants," http://portal.acm.org/citation.cfm?id=308679, 14 pages (Feb. 12, 1993).

Nowicki, Krzysztof, et al., "Estimation and Prediction for Stochastic Blockstructures," 96(455) *Journal of the American Statistical Assoication* 1077-1087 (Sep. 2001).

Pazzani, Michael J., "A Framework for Collaborative, Content-Based and Demographic Filtering," Artficial Intelligence Review, vol. 13; 393-408; 2004.

Resnick, Paul, et al., "GroupLens: An Open Architecture for Collaborative Filtering of Netnews," and *Proceedings of ACM 1994 Conference on Computer Supported Cooperative Work*, Chapel Hill, NC, pp. 175-186 (1994).

\* cited by examiner

Initialize with arbitrary latent variable assignments $\tilde{p}$
Repeat
  Generalized E-Step
  Step 1: Update Priors: $\forall [I]_1^k, [J]_1^l$, $$\pi_{IJ} \leftarrow \sum_{ij} p_{ij} \tilde{p}(I|i)\tilde{p}(J|j)$$

Step 2: Update Interaction Effects: $\forall [I]_1^k, [J]_1^l$, $$\delta_{IJ} \leftarrow \underset{\delta}{\operatorname{argmax}} \sum_{ij} w_{ij} \sum_{IJ} \tilde{p}(I|i)\tilde{p}(J|j) \left(y_{ij}\delta_{IJ} - \psi(\beta^t x_{ij} + \delta_{IJ})\right)$$

Step 3: Update Regression Coefficients:

$$\beta \leftarrow \underset{\beta}{\operatorname{argmax}} \sum_{ij} w_{ij} \sum_{IJ} \tilde{p}(I|i)\tilde{p}(J|j) \left(y_{ij}\beta^t x_{ij} - \psi(\beta^t x_{ij} + \delta_{IJ})\right)$$

Generalized E-Step
  Step 4: Update Row Cluster Assignments: $\forall [i]_1^m, [I]_1^k$, $$\tilde{p}(I|i) \leftarrow c_i \left( \prod_{i,J} (\pi_{IJ} f_\psi(y_{ij}, \beta^t x_{ij} + \delta_{IJ}))^{w_{ij}\,\tilde{p}(J|j)} \right)^{\frac{1}{w_i}}$$

where $c_i$ is a normalizing factor s.t. $\sum_I \tilde{p}(I|i) = 1$ and $w_i = \sum_j w_{ij}$.
  Step 4: Update Column Cluster Assignments: $\forall [j]_1^n, [J]_1^l$, $$\tilde{p}(J|j) \leftarrow c_j \left( \prod_{i,I} (\pi_{IJ} f_\psi(y_{ij}, \beta^t x_{ij} + \delta_{IJ}))^{w_{ij}\,p(I|i)} \right)^{\frac{1}{w_j}}$$

where $c_j$ is a normalizing factor s.t. $\sum_J \tilde{p}(I|i) = 1$ and $w_{ij} = \sum_i w_{ij}$.
until convergence
return $(\beta, \Delta, \Pi, \tilde{p})$

FIG. 1

Initialize with arbitrary latent variable assignments $(\rho, \gamma)$
Repeat
  Generalized M-Step
  Step 1: Update Interaction Effects: $\forall [I]_1^k, [J]_1^l$, $$\delta_{IJ} \leftarrow \underset{\delta}{\operatorname{argmax}} \sum_{i \in I, j \in J} w_{ij} (y_{ij} \delta - \psi(\beta^t x_{ij} + \delta))$$

Step 2: Update Regression Coefficients:

$$\beta \leftarrow \underset{\beta}{\operatorname{argmax}} \sum_{ij} w_{ij} (y_{ij} (\beta^t x_{ij} - \psi(\beta^t x_{ij} + \delta_{\rho(i)\gamma(j)})))$$

Generalized E-Step
  Step 3: Update Row Cluster Assignments: $\forall [i]_1^m$, $$\rho(i) \leftarrow \underset{I}{\operatorname{argmax}} \left( \sum_j w_{ij} (y_{ij} \delta_{I\gamma(j)} - \psi(\beta^t x_{ij} + \delta_{I\gamma(j)})) \right)$$

Step 4: Update Column Cluster Assignments: $\forall [j]_1^n$, $$\gamma(j) \leftarrow \underset{J}{\operatorname{argmax}} \left( \sum_i w_{ij} (y_{ij} \delta_{\rho(i)J} - \psi(\beta^t x_{ij} + \delta_{\rho(i)J})) \right)$$

until convergence
return $(\beta, \Delta, \rho, \gamma)$

PREDICTIVE DISCRETE LATENT FACTOR MODELS FOR LARGE SCALE DYADIC DATA

BACKGROUND

1. Technical Field

The disclosed embodiments relate to statistical methods that provide predictive modeling based on large scale dyadic data, and more particularly, to modeling that simultaneously incorporates the effect of covariates and estimates local structure that is induced by interactions among the dyads through a discrete latent factor model.

2. Related Art

Predictive modeling for dyadic data is an important data mining problem encountered in several domains such as social networks, recommendation systems, internet advertising, etc. Such problems involve measurements on dyads, which are pairs of elements from two different sets. Often, a response variable $y_{ij}$ attached to dyads (i, j) measures interactions among elements in these two sets. Frequently, accompanying these response measurements are vectors of covariates $x_{ij}$ that provide additional information which may help in predicting the response. These covariates could be specific to individual elements in the sets or to pairs from the two sets. In most large scale applications, the data is sparse, high dimensional (i.e., large number of dyads), noisy, and heterogeneous; this makes statistical modeling a challenging task. The following real-world example elucidates further.

Consider an online movie recommendation application such as NetFlix, which involves predicting preference ratings of users for movies. This preference rating can be viewed as a dyadic response variable $y_{ij}$; it depends both on the user i and the movie j and captures interactions that exist among users and movies. Since both user and movie sets are large, the number of possible dyads is astronomical. However, most users rate only a small subset of movies, hence measurements (actual ratings provided by a user) are available only for a small fraction of possible dyads. In addition to the known user-movie ratings, there also exists other predictive information such as demographic information about users, movie content and other indicators of user-movie interactions, e.g., is the user's favorite actor part of the movie cast? These predictive factors can be represented as a vector of covariates $x_{ij}$ associated with user-movie dyad (i, j). Incorporating covariate information in the predictive model may improve performance in practice. It is also often the case that some latent unmeasured characteristics that are not captured by these covariates induce a local structure in the dyadic space (e.g., spatial correlations induced due to cultural similarities).

SUMMARY

By way of introduction, the embodiments described below include statistical methods that provide predictive modeling based on large scale dyadic data, and more particularly, to modeling that simultaneously incorporates the effect of covariates and estimates local structure that is induced by interactions among the dyads through a discrete latent factor model.

In a first aspect, a method is disclosed for predicting future responses from large sets of dyadic data, including measuring a dyadic response variable associated with a dyad from two different sets of data; measuring a vector of covariates that captures the characteristics of the dyad; determining one or more latent, unmeasured characteristics that are not determined by the vector of covariates and which induce local structures in a dyadic space defined by the two different sets of data; and modeling a predictive response of the measurements as a function of both the vector of covariates and the one or more latent characteristics, such that modeling includes employing a combination of regression and matrix co-clustering techniques, and wherein the one or more latent characteristics provide a smoothing effect to the function that produces a more accurate and interpretable predictive model of the dyadic space that predicts future dyadic interaction based on the two different sets of data.

In a second aspect, a method is disclosed for predicting a future response from a large set of dyadic data, including measuring a dyadic response variable associated with a dyad from two different sets of data; measuring a vector of covariates that captures the characteristics of the dyad; learning latent, unmeasured characteristics that are not determined by the vector of covariates and which induce local structures in a dyadic space defined by the two different sets of data; and modeling a predictive response of the measurements as a function of both the vectors of covariates and the latent characteristics, such that the latent characteristics provide a smoothing effect to the function that produces a more accurate and interpretable predictive model of the dyadic space that predicts future dyadic interaction based on the two different sets of data; such that modeling the predictive response includes use of co-clustering of latent characteristics with the vector of covariates to generate a response matrix having rows and columns, each row or column being exclusively assigned to a single latent characteristic. The method is executed such that learning includes determining a most informative set of latent covariates of a specific form of disjointed blocks of the response matrix that most accurately produces the modeled predictive response, and fitting a general linear model (GLM) over a combination of covariates in $X \in \Re^{m \times n \times s}$ and $X^{latent} \in \Re^{m \times n \times kl}$ associated with k×l co-clusters.

In a third aspect, a method is disclosed for predicting a future response from a large set of dyadic data, including measuring a dyadic response variable associated with a dyad from two different sets of data; measuring a vector of covariates that captures the characteristics of the dyad; learning latent, unmeasured characteristics that are not determined by the vector of covariates and which induce local structures in a dyadic space defined by the two different sets of data; and modeling a predictive response of the measurements as a function of both the vectors of covariates and the latent characteristics, such that the latent characteristics provide a smoothing effect to the function that produces a more accurate and interpretable predictive model of the dyadic space that predicts future dyadic interaction based on the two different sets of data; and such that modeling the predictive response includes use of co-clustering of latent characteristics with the vector of covariates to generate a response matrix having rows and columns, each row or column being exclusively assigned to a single latent characteristic. The method is executed such that learning includes determining a most informative set of latent covariates of a specific form of disjointed blocks of the response matrix that most accurately produces the modeled predictive response, and performing feature selection over the newly identified set of covariates to obtain a predictive model that allows better generalization.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 1 is a flow chart of a generalized expectation-maximization (EM) algorithm for a predictive discrete latent factor (PDLF) model.

FIG. 2 is a flow chart of a hard PDLF algorithm based on a hard assignment PDLF model.

DETAILED DESCRIPTION

Figure 3:
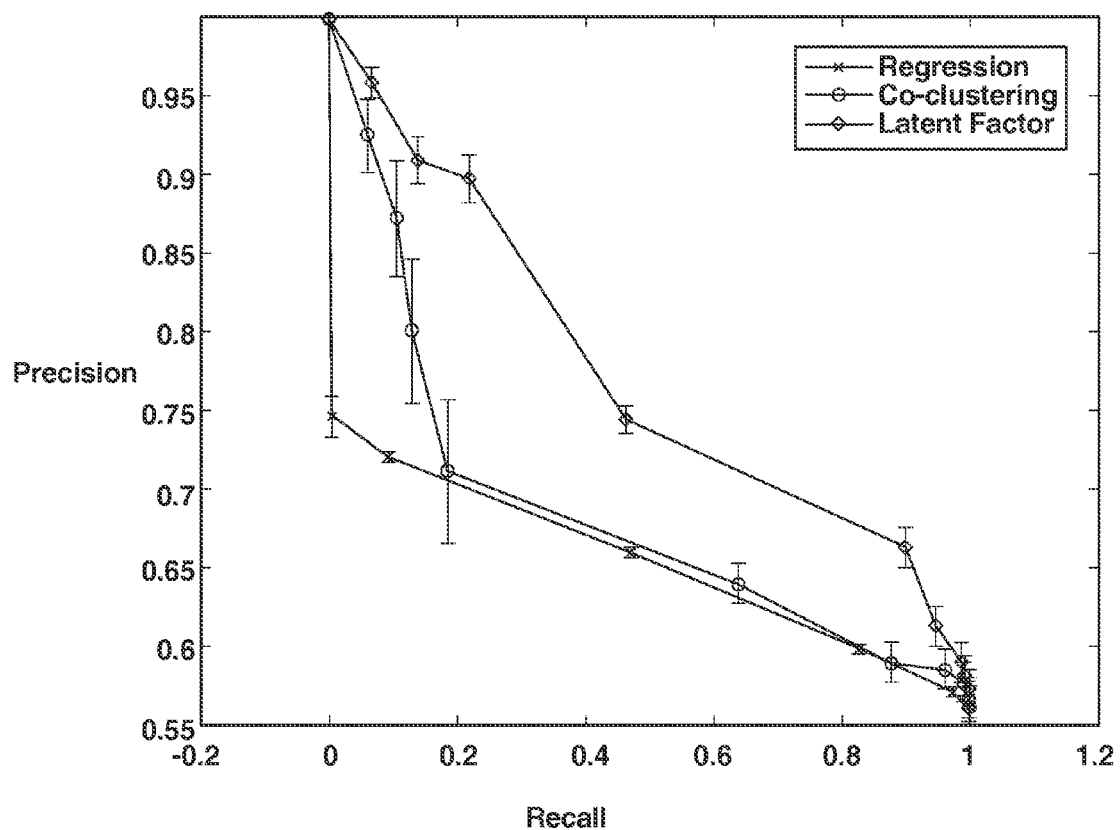
FIG. 3 is a diagram that displays precision-recall curves on MovieLens data, in which k=l=5 for both the PDLF and cross-associations learning.

In the following description, numerous specific details of programming, software modules, user selections, network transactions, database queries, database structures, etc., are provided for a thorough understanding of various embodiments of the systems and methods disclosed herein. However, the disclosed system and methods can be practiced with other methods, components, materials, etc., or can be practiced without one or more of the specific details. In some cases, well-known structures, materials, or operations are not shown or described in detail. Furthermore, the described features, structures, or characteristics may be combined in any suitable manner in one or more embodiments. The components of the embodiments as generally described and illustrated in the Figures herein could be arranged and designed in a wide variety of different configurations.

The order of the steps or actions of the methods described in connection with the disclosed embodiments may be changed as would be apparent to those skilled in the art. Thus, any order appearing in the Figures, such as in flow charts or in the Detailed Description is for illustrative purposes only and is not meant to imply a required order.

Several aspects of the embodiments described are illustrated as software modules or components. As used herein, a software module or component may include any type of computer instruction or computer executable code located within a memory device and/or transmitted as electronic signals over a system bus or wired or wireless network. A software module may, for instance, include one or more physical or logical blocks of computer instructions, which may be organized as a routine, program, object, component, data structure, etc. that performs one or more tasks or implements particular abstract data types.

In certain embodiments, a particular software module may include disparate instructions stored in different locations of a memory device, which together implement the described functionality of the module. Indeed, a module may include a single instruction or many instructions, and it may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices.

The predictive problem discussed above in the Background is not specific to movie recommendation systems and arises in several other contexts, e.g., in click rate estimation for webpage-ad dyads in internet advertising, estimating probabilities of a call between telephone dyads in telecommunication networks, etc. Prior work provides solutions using both supervised and unsupervised learning approaches. The supervised learning approach involves building a regression or a classification model to predict the dyadic response $y_{ij}$ solely as a function of the available covariates $x_{ij}$. It has been well-studied with considerable literature on selecting informative covariates and obtaining bounds on the generalization error. However, in general, this approach disregards any local structure that might be induced on the dyadic space due to other latent unmeasured factors. In contrast, the unsupervised approach focuses exclusively on capturing local structures in the response measurements on dyads. The discovered latent structures (e.g., clusters, principal components) provide insights about the interactions in the dyadic space which are useful in the absence of informative covariates. In fact, these local structures provide a parsimonious model for succinctly capturing the interactions in the dyadic matrix. However, since this approach does not adjust for the effects of covariates, the resulting latent structure may contain redundant information.

Proposed are statistical methods that combine the benefits of both supervised and unsupervised learning approaches by simultaneously incorporating the effect of covariates as in supervised learning while also accounting for any local structure that may be present in the data as in unsupervised learning. To achieve this, the response is modeled as a function of both covariates (captures global structure) and a discrete number of latent factors (captures local structure). Referring elements in the two sets that form the dyads as rows and columns, our model assumes that the row and column elements are separately assigned to a finite number of row and column clusters (or factors). The cross-product of these row and column clusters partition the dyadic matrix into a small number of rectangular block clusters that provide an estimate of latent factors. The row-column decoupling strategy provides an efficient algorithm to estimate latent structures by iteratively performing separate row and column clusterings.

Note also that when the assignments are exclusive (i.e., "hard") as opposed to probabilistic (i.e., "soft"), each row and column is assigned to one and only one row and column cluster respectively. This partitions the dyadic matrix into a small number of rectangular blocks or co-clusters. In this case, the covariate information and local structures are incorporated simultaneously by assuming that the mean (or some function of the mean) of the response variable is a sum of some unknown function of the covariates and a block-specific constant, both of which get estimated from the data. We note that for models solely based on covariates, the additional block-specific constant that is extracted by our method is assumed to be part of the noise model; by teasing out this extra information parsimoniously through a piecewise constant function, we provide a model that may lead to better generalization in practice. Furthermore, the estimated blocks and the corresponding constants are often representative of some latent unmeasured factors that contributes to the interactions seen in our dyadic matrix. For instance, cultural preferences may cause users in a certain geographic region to provide higher ratings to certain class of movies. The clusters obtained from these methods when subjected to further analysis and follow-ups with domain experts may discover such patterns. Thus, the model disclosed herein is both accurate in terms of predictions and interpretable in terms of the clusters obtained.

To illustrate the methodology, we confine ourselves to the framework of generalized linear models (GLMs), which provides a flexible class of predictive methods based on exponential families. This class includes Gaussian, Poisson, and Bernoulli distributions as special cases. Further, for this special class of statistical models, we model the latent factors through an approach that is related to co-clustering using Bregman divergences. This model finds a co-clustering that provides the best predictive performance after adjusting for the covariates, which is accomplished through an iterative model fitting process in the generalized expectation maximization (EM) framework.

This disclosure provides a predictive modeling approach for dyadic data that simultaneously exploits information in the available covariates and the local structure present in the dyadic response matrix. Presented is a method to model dyadic response as a function of available predictor information and unmeasured latent factors through a predictive discrete latent factor model (hereinafter "PDLF"). Also provided is a model-based solution in the framework of generalized linear models (GLMs), which constitute a broad and flexible family of predictive models based on exponential families. In fact, it includes the widely used least-squares regression and logistic regression techniques as special cases.

Also proposed are scalable, generalized EM-based algorithms for "soft" and "hard" assignments that are linear in the number of non-zeros in the dyadic matrix. The algorithms generalize several existing algorithms including GLM regression, co-clustering using Bregman divergences, cross-association learning, non-parametric maximum likelihood estimator (NPMLE), etc. Presented is an extensive empirical evaluation of our procedure through simulation experiments, analysis of a publicly available movie rating dataset, and illustrations on a real dataset from an internet advertising application. We show that the PDLF model provides better prediction results and additional insights about the data in the form of highly interpretable clusters or latent factors.

We begin with a brief review of (i) one parameter exponential families, generalized linear regression models, and (ii) co-clustering for dyadic data.

Exponential Families:

One-parameter exponential families provide a coherent framework to study commonly occurring prediction problems with univariate response. A random variable X with density $f(\chi;\theta)$ is said to belong to a one-parameter exponential family if $$f(x;\theta) = \exp(\theta t(x) - \psi(\theta))p_0(x). \quad (2.1)$$

Here, the unknown parameter (also called the natural parameter) $\theta \in \Theta$; $p_0(x)$ is a probability measure that does not depend on $\theta$; $\psi(\theta)$ is the cumulant generating function of X, $t(x)$ is some function of x (in most examples, $t(x)=x$). (To keep the exposition simple, the dispersion parameter is assumed to be 1.) In fact, $E(t(X))=\psi'(\theta)$ and $Var(t(X))=\psi''(\theta)$. Table 2.1 shows three examples of exponential distributions and the associated parameters and cumulant functions.

TABLE 2.1

Examples of exponential families and associated parameters and cumulant functions. The natural statistic $t(x) = x$ for all three cases and $\sigma$ is assumed to be constant.

| Exponential Family | PDF | Natural parameter $\theta$ | Cumulant $\psi(\theta)$ |
|---|---|---|---|
| Gaussian | $\frac{1}{\sqrt{(2\pi\sigma^2)}} e^{-\frac{(x-\mu)^2}{2\sigma^2}}$ | $\frac{\mu}{\sigma}$ | $\frac{\sigma^2}{2}\theta^2$ |
| Poisson | $\frac{\lambda^x e^{-\lambda}}{x!}$ | $\log \lambda$ | $e^\theta$ |
| Bernoulli | $p^x(1-p)^{(1-x)}$ | $\log\left(\frac{p}{1-p}\right)$ | $\log(1+e^\theta)$ |

Generalized Linear Models:

Generalized linear models (GLM) provide an abstract framework to study classification and regression problems that are commonly encountered in practice. Least squares regression for continuous response and logistic regression for binary response are special cases. A GLM is characterized by two components, as follows. (i) The distribution of the response variable Y belongs to a member of the exponential family as defined in equation 2.1 with examples provided in Table 2.1.

(ii.) The mean $\mu(\theta)=\psi'(\theta)$ is some unknown function of the predictor vector x, i.e., $\mu(\theta)=g^{-1}(x; \beta)$ for some unknown vector $\beta$. The most common choice is to assume g is a function of $x'\beta$. The function g which ensures that $g(\mu)$ is a linear function of the predictors is often referred to as a link function and the choice of g that ensures $\theta=x'\beta$ is called the canonical link function. For instance, in the case of a Bernoulli distribution, $g(\mu)=\log(\mu/(1-\mu))$. Table 2.2 provides examples of canonical link functions for common exponential family members. Unless otherwise mentioned, we will only consider canonical link functions in our subsequent discussions.

TABLE 2.2

Examples of generalized linear models for different types of response variables

| GLM | Response Type | Link Function g(y) | Exponential Family |
|---|---|---|---|
| Least-squares Regression | $y \in \mathbb{R}$ | y | Gaussian |
| Poisson Regression | $y \in \mathbb{Z}_{++}$ | log(y) | Poisson |
| Logistic Regression | $y \in \{0, 1\}$ | $\log\left(\frac{y}{1-y}\right)$ | Bernoulli |

Thus, if the response Y follows a GLM, the conditional density $f(y; \beta'x)$ of y given x depends on the unknown parameter $\beta$ only through the linear function, $\beta'x$. Although predictive methods based on GLMs are in general effective, they fail to account for unobserved interactions that are often present in dyadic data after adjusting for the covariates; the disclosed methods provide a solution to this problem. Before proceeding further, we provide background material on matrix co-clustering, which is closely related to the disclosed methods. In fact, the disclosed methods capture unaccounted interactions by performing co-clustering in a latent space through a mixture model that will be disclosed in more detail.

Matrix Co-clustering:

Co-clustering, or simultaneous clustering of both rows and columns, has become a method of choice for analyzing large and sparse data matrices due to its scalability and has been shown to be effective for predicting missing values in dyadic data, exploiting the interactions that are often present in the observed response values. In particular, the Bregman co-clustering framework presents a formulation from a matrix approximation point of view, wherein the row and column clusterings are chosen so as to minimize the error between the original matrix Y and a reconstructed matrix $\hat{Y}$ (called the minimum Bregman information matrix) that depends only on the co-clustering and certain summary statistics of Y. e.g., co-cluster means. This formulation allows the approximation error to be measured as the weighted sum of element-wise Bregman divergence between the matrices Y and $\hat{Y}$. This co-clustering formulation also permits an alternate interpretation in terms of a structured mixture model. We briefly describe this connection.

For dyad (i, j), let $\rho(i)$ and $\gamma(i)$ denote the row and column membership of the $i^{th}$ row and $j^{th}$ column respectively. We assume the cluster ids for rows and columns belong to the sets $\{I:I=1, \ldots, k\}$ and $\{J:J=1, \ldots, l\}$ respectively. Whenever appropriate, I and J is used as shorthand to mean $\rho(i) = I$ and $\gamma(i) = J$, respectively. Now, consider a mixture model given by $$p(y_{ij}) = \sum_{I,J} p(I, J) p(y_{ij} | I, J) = \sum_{I,J} \pi_{I,J} f_\psi(y_{ij}; \theta_{i,j,I,J}) \qquad (2.2)$$

where $\pi_{I,J}$ denotes the prior probabilities associated with the latent variable pair (I, J) and $\theta_{i, j, I, J}$ is the corresponding natural parameter that could have additive structural constraints, e.g., $\theta_{i,j,I,J} = \theta_i + \theta_j + \theta_{I,J}$ (accommodates row, column and co-cluster interactions) or $\theta_{i, j, I, J} = \theta_{I, J}$ (accommodates only co-cluster interactions). Using the bijection result between (regular) exponential families and a special class of Bregman divergences and the projection theorem characterizing the optimality of minimum Bregman information matrix with respect to generalized additive models in the natural parameter space, it can be shown that maximizing the log-likelihood of Y with respect to the appropriate choice of the mixture model equation (2.2) is analogous to minimizing the reconstruction error in the Bregman co-clustering framework. The mixture model, in general, results in soft cluster assignments and is equivalent to the "hard" Bregman co-clustering formulation when the dispersion of the mixture components is assumed to be zero.

We note that conditional on the latent variables $\rho(i), \gamma(i)$, the mixture model in equation (2.2) captures interactions through the block means. (Henceforth, each mixture component will be referred to as a block to maintain the analogy with the hard assignment case.) The main issue is to find an optimal clustering to adequately explain the local structure in our data. Also, omitting covariates may provide clusters that contain redundant information and inferior predictive performance; hence, the need to simultaneously adjust both for covariates and find an optimal clustering.

Predictive Discrete Latent Factor Model:

The predictive discrete latent factor (PDLF) model for dyadic response as disclosed herein simultaneously incorporates information in the covariates within the GLM framework and accounts for unmeasured interactions via co-clustering methods. A generalized EM algorithm estimates the model parameters, which algorithm is guaranteed to monotonically increase the marginal likelihood until it attains a local maximum.

Let $Y=[y_{ij}] \in \mathfrak{R}^{m \times n}$ denote the response matrix and let $X=[x_{ij}] \in \mathfrak{R}^{m \times n \times s}$ denote the tensor corresponding to s prespecified covariates with $x_{ij} \in \mathfrak{R}^s$. Further, let $W=[w_{ij}] \in \mathfrak{R}^{m \times n}$ denote non-negative weights associated with the observations in Y. (In our examples, this is set to 1 for a valid observation and 0 for missing ones.)

Given k×l blocks (I, J) with prior probabilities $\pi_{I,J}$, the marginal distribution of response given covariates is given as $$p(y_{ij} | x_{ij}) = \sum_{I,J} \pi_{I,J} f_\psi(y_{ij}; \beta^t x_{ij} + \delta_{I,J}), [i]_1^m [j]_1^n, \qquad (3.3)$$

where $f_\psi$, is an exponential family distribution with cumulant $\psi(\cdot)$, $\beta \in \mathfrak{R}^s$ denotes the regression coefficients associated with the pre-specified covariates, $\pi_{I,J}$ denotes the prior probabilities and $\delta_{I,J}$ denotes the interaction effects associated with the block (I, J). Writing $\theta_{ij, I,J} = \beta^t x_{ij} + \delta_{I, J}$ and comparing with equation (2.2), we see the difference between the usual co-clustering models and PDLF. The latter is a richer class which performs co-clustering on the residuals after adjusting for the effect of covariates. Furthermore, the estimation of covariate effects and co-cluster means on the residuals are carried out simultaneously; the usual practice of detrending the data first to remove covariate effects and clustering the residuals may provide suboptimal results since the effects are not orthogonal. We note than an alternate way of forming a mixture distribution that is often pursued in the statistics literature is through a semi-parametric hierarchical model wherein $g(\mu_{ij}) = \beta^t x_{ij} + \delta_{ij}$, and $\delta_{ij}$ s follow a clustering model, namely, a mixture of distributions.

For instance, if $$y_{ij} | \delta_{ij} \sim N(\beta^t x_{ij} + \delta_{ij}, \sigma^2) \text{ and } \delta_{ij} \sim \sum_{i=1}^{k} \pi_i N(\mu_i, \tau^i),$$

the marginal distribution of $y_{ij}$ is a mixture of Gaussians given by $$\sum_{p=1}^{k} \pi_k N(\beta^t x_{ij} + \mu_p, \sigma^2 + \tau^p)$$

which is structurally similar to equation (3.3). However, such an approach does not exploit the special structure of the dyadic data which is done by the block model in equation (3.3). In particular, the block model assumes that block membership of dyadic elements can be completely specified in terms of row and column memberships in the corresponding row and column clusters, respectively. This feature, e.g. factorized, grid-like assignment of the dyads in the disclosed methods makes them scalable. A two-dimensional clustering problem is expressed in terms of two iterative, one dimensional clusterings. In fact, the co-clustering method could be viewed as a process that iteratively clusters rows and columns; clustering on columns has a smoothing effect which enhances row clustering and vice versa.

More specifically, there exist latent variables $\rho(i)$ and $\gamma(j)$ attached to the $i^{th}$ row and $j^{th}$ column which take values in the cluster membership sets $\{I:I=1, \ldots, k\}$ (row clusters) and $\{J:J=1, \ldots, l\}$ (column clusters). Thus, each observation is assumed to have been generated from a mixture distribution with k×l components, each of which corresponds to a particular choice of (I, J). Further, the mean function of each component distribution includes a term that models the dependence of response on covariates. Thus, the dyads (i,j) are assigned to blocks (I, J) (fractional for soft clustering, degenerate for hard clustering) and within each block, the mean is some global function of the covariates, but adjusted by block-specific off-sets $\{\delta_{I, J}\}$. Hence, we capture the local structure using a piecewise constant function with the row and cluster assignments imposing a block structure and simplifying the computations.

Generalized Expectation-Maximization (EM) Algorithm:

We present a generalized EM algorithm to fit the mixture model in equation (3.3) to the data. Throughout, $\theta_{ij,IJ}=\beta'x_{ij}+\delta_{I,J}$. Assuming the observations are all generated from equation (3.3) with weights given by W, the incomplete data log-likelihood is given by $$L(\beta, \Delta, \Pi) = \sum_{i,j} w_{ij} \log(p(y_{ij})) \quad (3.4)$$

$$= \sum_{i,j} w_{ij} \log\left(\sum_{I,J} \pi_{IJ} f_\psi(y_{ij}; \theta_{ij,IJ})\right)$$

where $\beta$, $\Delta = \{\{\delta_{IJ}\}_I^{k=1}\}_J^{l=1}$ and $\Pi = \{\{\pi_{IJ}\}_I^{k=1}\}_J^{l=1}$ denote the model parameters. As in the case of simple mixture models, this data log-likelihood is not a convex function of the parameters ($\beta, \Delta, \Pi$) and cannot be readily optimized.

To facilitate maximization of log-likelihood defined in equation (3.4), we consider a complete data likelihood obtained by augmenting $\{y_{ij}\}_{ij}$ with the latent variables $\{\rho(i)\}_i$ and $\{\gamma(j)\}_j$. Consider a free-energy function, which is defined as the sum of the expected complete log-likelihood and the entropy of the latent variables with respect to an arbitrary distribution $\tilde{p}(\{\rho(i)\}_i, \{\gamma(j)\}_j)$.

Since $\{y_{ij}\}_{ij}$ are conditionally independent given the cluster assignments, which are themselves independent for $\{\rho(i), \gamma(j)\}_{ij}$ for different values of $(i, j)$, it suffices to assume that $\tilde{p}(\{\rho(i)\}_i, \{\gamma(j)\}_j) = \Pi_{ij}\ \tilde{p}_{ij}(\rho(i), \gamma(j))$. Then, the free-energy function is given as $$F(\beta, \Delta, \Pi, p) = \sum_{ij} w_{ij} W_{\tilde{p}_{ij}}[\log p(y_{ij}, \rho(i), \gamma(j))] + \sum_{ij} w_{ij} H(\tilde{p}_{ij}) \quad (3.5)$$

where $$F(\beta, \Delta, \Pi, \overline{p}) = \sum_{ij} w_{ij} E_{\tilde{p}_{ij}}[\log p(y_{ij}, \rho(i), \gamma(j))] + \sum_{ij} w_{ij} H(\overline{p}_{ij}) \quad (3.5)$$

The EM procedure can also be viewed as a greedy maximization approach where one alternates between maximizing F with respect to $\beta$, $\Delta$, $\Pi$ for a fixed $\tilde{p}$ (call it the M-step) and maximizing $\tilde{p}$ for a fixed $\beta$, $\Delta$, $\Pi$ (call it the E-step). This formulation of the EM algorithm leads to alternative maximization procedures. For instance, in our case, optimizing $\tilde{p}$ in terms of either $\{\rho(i)\}_i$ or $\{\gamma(j)\}_j$ while holding the other fixed and alternating with the M-step would still increase the marginal likelihood at every iteration. In fact, the value of $\tilde{p}$ which maximizes F for fixed $\beta$, $\Delta$, $\Pi$ is $P(\{\rho(i), \gamma(j)\}_{ij|\{y_{ij}\}_{ij}}, \beta, \Delta, \Pi) = \Pi_{ij} P(\rho(i), \gamma(j)|y_{ij}, \beta, \Delta, \Pi)$ where $P(\rho(i)=I, \gamma(j)=J|y_{ij}, \beta, \Delta, \Pi) \propto \pi_{IJ} f_\psi(y_{ij}; \theta_{ij,IJ})^{w_{ij}}$. This forms the basis of the classical EM algorithm in the context of mixture models but is too slow in practice for our problem, especially when the number of $\{y_{ij}\}$ gets large. To expedite computations, we confine ourselves to the class of $\tilde{p}_{ij}$ that factorize as $\tilde{p}_{ij}(\rho(i), \gamma(j))=\tilde{p}_i(\rho(i))\tilde{p}_j(\gamma(j))$ in our generalized EM procedure. This implicitly assumes that $\rho(i)$ and $\gamma(j)$ are independent a-posteriori, an approximation that approaches the true posterior as the joint posterior of $\rho(i)$, $\gamma(j)$ approaches degeneracy.

FIG. 1 is a flow chart of the complete steps of the EM algorithm for a predictive discrete latent factor (PDLF) model, and its steps can be executed in any order. The input includes a response matrix $Y=[y_{ij}] \in \Re^{m \times n}$ with measure $W=[w_{ij}] \in [0, 1]^{m \times n}$, covariates $X=[x_{ij}] \in \Re^{m \times n \times s}$ exponential family with cumulant $\psi$, number of row clusters k and number of row cluster l. The output includes regression coefficients $\beta$, implicit interaction effects $\Delta$, mixture component priors $\Pi$, latent variable assignments $\tilde{p}$ that locally optimize the objective function in equation 3.5.

Under mild conditions, it can be shown that each of the steps in the algorithm of FIG. 1 monotonically increases the free energy function, with at least one step resulting in a strict increase, till a local optimum is attained. In particular, steps 4 and 5 in FIG. 1 provide an iterative clustering scheme whereby rows are clustered exploiting the column clustering already obtained and vice versa. This characteristic of being able to assign each observed dyadic measurement to a block through a sequence of row and column clusterings is the feature that makes the algorithm scalable and converge fast.

The generalized EM approach in the algorithm of FIG. 1 provides closed form updates for the prior block probabilities $\{\pi_{IJ}\}$ and also the row and column cluster assignments, each of which only requires a computation time of O(Nkl) per iteration, where N denotes the number of observations in Y (i.e., elements such that $w_{ij} \neq 0$). The regression coefficients $\beta$ and interaction effects $\Delta$, in general, do not have closed form updates, but can be readily computed using convex optimization methods such as the Newton-Raphson's method. In fact, since the generalized EM algorithm does not require an exact optimization over each argument, it is sufficient to perform a few iterations of the Newton-Raphson's method, each of which requires a computation time of $O(N(kl+s^2))$. Thus, assuming a constant number of iterations, the overall algorithm only requires a computation time that is linear in the number of observations.

TABLE 3.3

Update steps for the regression coefficients and interaction effects for important special cases.

| Exponential Family | β Update | Δ Update |
|---|---|---|
| Gaussian | Single least-squares regression | $\delta_{IJ} \leftarrow \frac{1}{\pi_{IJ}} \sum_{i,j} w_{ij}\tilde{p}_i(I)\tilde{p}_j(J)(y_{ij} - \beta'x_{ij})$, $[I]_1^k$, $[J]_1^l$ |
| Poisson | Newton-Raphson's method | $\delta_{IJ} \leftarrow \log\left(\frac{\sum_{i,j} w_{ij}\tilde{p}_i(I)\tilde{p}_j(J)y_{ij}}{\sum_{i,j} w_{ij}\tilde{p}_i(I)\tilde{p}_j(J)\beta'x_{ij}}\right)$, $[I]_1^k$, $[J]_1^l$ |
| Bernoulli | Newton-Raphson's method | Newton-Raphson's method |

For special cases such as Gaussian and Poisson distributions, it turns out that the interaction effects $\Delta$ can be computed in closed form as in Table 3.3. This is possible due to the functional form of the cumulant which is given by $\psi(x) \propto x^2$ for Gaussian and $\psi(x) \propto \exp(x)$ for the Poisson. For the Gaussian, the regression coefficients $\beta$ can also be computed in closed form using a weighted least squares regression on the residuals $y_{ij}-\delta_{IJ}$.

Hard Assignment PDLF Model:

In this section, a special case of the latent factor model is analyzed where each row (or column) is exclusively assigned to a single latent factor, i.e., a row (or column) cluster, and describe a highly scalable algorithm for this setting.

For the special case corresponding to hard assignments, the latent factor model in equation (3.3) can be expressed as $$p(y_{ij}|X_{ij}, \rho, \gamma) = f_\psi(y_{ij}; \beta'x_{ij}+\delta_{\rho(i), \gamma(j)}), [i]_1^m [j]_1^n, \quad (4.6)$$

where the $ij^{th}$ element is assigned exclusively to the block $(\rho(i), \gamma(j))$. For every block $(I, J)$, let $x_{latent}^{I,J}$ denote a binary-valued covariate that indicates if a dyad belongs to the $IJ^{th}$ block, i.e., $$x_{ij}^{latent^{I,J}} = 1, \text{ when } I = \rho(i), J = \gamma(j)$$

$$= 0, \text{ otherwise.}$$

We can now express the PDLF model in equation (4.6) as a generalized linear model over the initial set of covariates $X \in \Re^{m \times xs}$ and new set of latent covariates $X^{latent} \in \Re^{m \times n \times k \times l}$ associated with the k×l co-clusters, i.e., $$p(y_{ij}|x_{ij}, x_{ij}^{latent}) = f_\psi(y_{ij}; \beta^t x_{ij} + \Delta^t x_{ij}^{latent}), [i]_1^m [j]_1^n, \quad (4.7)$$

with $\Delta$ being the coefficients of the covariates $X^{latent}$. However, unlike in a simple generalized linear model, the covariates $X^{latent}$ are not known beforehand. Hence, the learning procedure in this case involves two steps: (a) Discovering the "most informative" set of latent covariates of a specific form (binary-valued indicators of disjoint blocks of the response matrix), i.e., the best co-clustering $(\rho, \gamma)$. (b) Fitting a GLM over the combination of covariates in X and $X^{latent}$. Note that we need to ensure that the covariates in $[X, X^{latent}]$ are linearly independent, possibly by excluding some of the co-cluster covariates, in order that the model is not over-parameterized.

The above two steps, in fact, correspond to the generalized EM steps in the algorithm of FIG. 1 To see the connection, consider the free energy function in equation (3.5). Since each row (or column) is exclusively assigned to a single row (or column) cluster, the conditional entropy term vanishes and there is also no dependency of the assignments on the priors of the mixture components. Hence, the free energy function (up to an additive constant) for the hard assignment case is given by $$F^{hard}(\beta, \Delta, \rho, \gamma) = \sum_{ij} w_{ij} \log f_\psi(y_{ij}; \beta^t x_{ij} + \delta_{\rho(i), \gamma(j)}) \quad (4.8)$$

$$= \sum_{ij} w_{ij} \log f_\psi(y_{ij}; \beta^t x_{ij} + x_{ij}^{latent^t} \Delta)$$

$$= F^{hard}(\beta, \Delta, x_{ij}^{latent}).$$

As in the case of the general PDLF model in equation (4.6), the above objective function can be optimized by a repeatedly maximizing over the parameters $\beta$, $\Delta$ and the cluster assignments $(\rho, \gamma)$ (i.e., latent covariates $X^{latent}$) until a local maximum of the likelihood function is attained.

FIG. 2 is a flow chart of a hard PDLF algorithm based on a hard assignment PDLF model as just discussed, showing also the detailed updates. The inputs include response matrix $Y = [y_{ij}] \in \Re^{m \times n}$ with measure $W = [p_{ij}] \in [0, 1]^{m \times n}$, covariates $X = [x_{ij}] \in \Re^{m \times n \times s}$ exponential family with cumulant $\psi$, number of row clusters k and number of row cluster l. The output includes regression coefficients $\beta$, implicit interaction effects $\Delta$, hard latent variable assignments $(\rho, \gamma)$ that locally optimize the objective function in equation 4.8.

Note that for any exponential family distribution, $f_\psi$, the update steps for the regression coefficients $\beta$ and interaction effects $\Delta$ in the algorithm of FIG. 2 can be combined into a single GLM regression. Since each row (or column) is assigned to single row (or column) cluster, the cluster assignments can also be performed quite efficiently requiring a computation time of only O(N(k+l)) per iteration.

Special Cases: GLM and Block Co-clustering:

Since the PDLF model combines ideas from GLMs and co-clustering, one would naturally expect these two methods to be special cases of the generalized EM algorithm for PDLF.

GLM. When k=l=1, the entire dyadic space forms a single co-cluster so that there do not exist any latent covariates. Hence, the model in equation (4.7) reduces to a simple GLM.

Co-clustering. In the absence of pre-specified covariates, the free energy function (up to an additive constant) in equation (4.8) reduces to $$F^{hard}(\Delta, \rho, \gamma) = \sum_{ij} w_{ij} \log f_\psi(y_{ij}; \delta_{\rho(i), \gamma(j)}). \quad (4.9)$$

Using the bijection between regular exponential families and Bregman divergences [3], we can further rewrite it as $$F^{hard}(\Delta, \rho, \gamma) = -\sum_{ij} w_{ij} d_\phi(y_{ij}, \hat{y}_{\rho(i), \gamma(j)}), \quad (4.10)$$

where $d_\phi$ is the Bregman divergence corresponding to the Legendre conjugate of $\psi$ and $\hat{y}_{\rho(i), \gamma(j)} = \psi'(\delta_{\rho(i), \gamma(j)})$. The likelihood maximization problem can now be cast as minimizing the matrix approximation error with respect to the original response Y using a simple reconstruction based on block co-clustering (i.e., basis $C_2$ in A. Banerjee, I. Dhillon, J. Ghosh, S. Merugu, and D. Modha, *A generalized maximum entropy approach to Bregman co-clustering and matrix approximation*, JMLR (to appear 2007)).

Empirical Evaluation:

In this section is provided empirical evidence to highlight the flexibility and efficacy of the PDLF approach. First, we describe controlled experiments on simulated data to analyze the predictive performance of the disclosed algorithms relative to other existing approaches. Then, we present results on real-world datasets for movie recommendations (MovieLens dataset) and ad click-analysis (Yahoo! internal dataset) to demonstrate the benefits of our approach for a variety of learning tasks such as relevance classification, imputation of continuous missing values, and feature discovery.

Simulation Studies on Gaussian Models:

We first study the performance of the predictive modeling algorithms (FIGS. 1 and 2) on synthetic data generated from the PDLF moel, and some simpler special cases of PDLF described in table 5.4.

TABLE 5.4

Generative models used for simulation studies

| Model | Parameter Constraints | Appropriate Algorithm |
|---|---|---|
| $M_1$ | none | Soft PDLF Algorithm |
| $M_2$ | $\mu = 0, \nu = 0, \Delta = 0$ | Linear Regression |
| $M_3$ | $\Delta = 0$ | Linear Regression with row/col effects |
| $M_4$ | $\beta = 0, \mu = 0, \nu = 0$ | Co-clustering |
| $M_5$ | $\beta = 0,$ | Co-clustering with row/col effects |

Data Simulation. To choose realistic parameters for the generative models, we analyzed a subsample of the MovieLens dataset consisting of 168 users, 197 movies and 2872 ratings (response variable) as well as attributes based on user demographics (e.g., age/gender/occupation) and movie genres (e.g., science-fiction/thriller). From this dataset, we obtained four covariates and computed the corresponding linear regression coefficients (i.e.,) using a Gaussian linear model for the ratings. We also independently co-clustered the response matrix (assuming k=l=5) without using the covariate information to obtain co-clusters, reasonable values for the co-clusters priors $\pi$, the row/column effects (say $\mu \in \Re^m$ and $\nu \in \Re^n$ and the co-cluster interaction effects (i.e., $\Delta$). We consider five generative models based on various combinations of these parameters as shown in Table 5.4. In each case, we simulated 200 datasets from the model.

Model Recovery using Soft and Hard Assignments:

For our first experiment, we used the 200 datasets generated from the PDLF model, i.e., the mixture of generalized linear models $M_1$. Experimental results here is (a) to provide a sanity check on the PDLF model by fitting it to data where it should work and (b) to compare the effectiveness of the generalized EM (or "soft") algorithm (FIG. 1) and the one that uses hard assignments (FIG. 2) in estimating the true model parameters.

To each simulated data, we applied the PDLF algorithms corresponding to Gaussian distributions with k=l=5. To avoid local optima, for each dataset, we repeated the algorithm with five different initializations and picked the best overall solution (we did not initialize with the true cluster assignments or true parameter values that were used in the simulations.) Table 5.5 shows the true values of the covariate coefficients β and the 95% confidence intervals for the soft and hard PDLF algorithms.

TABLE 5.5

95% quantiles of the β values estimated using the "soft" and "hard" PDLF algorithms.

| Algo | $\beta_0$ | $\beta_1$ | $\beta_2$ | $\beta_3$ | $\beta_4$ | $\sigma^2$ |
|---|---|---|---|---|---|---|
| True | 3.78 | 0.51 | −0.28 | 0.14 | 0.24 | 1.16 |
| Soft | (3.69, 3.84) | (−0.31, 0.71) | (−0.52, −0.19) | (−0.05, 0.17) | (−0.64, 1.04) | (1.14, 1.27) |
| Hard | (3.66, 3.84) | (−0.63, 0.62) | (−0.58, −0.16) | (−0.09, 0.18) | (−0.68, 1.05) | (0.90, .99) |

From the results, we observe that the true β values always lie in the 95% confidence interval for both the algorithms (FIGS. 1 and 2), thus providing a sanity check on our code, our model formulation, and our algorithms. In comparing the soft and hard PDLF algorithms, while the values are similar (hard PDLF tends to have slightly higher variation in estimating β), the dispersion parameter or variance of the Gaussian distribution is underestimated by hard PDLF, evidence of overfitting. The 95% confidence intervals for $\sigma^2$ obtained from the soft PDLF algorithm includes the truth. To avoid the overfitting problem with hard PDLF, we implemented a hybrid PDLF model whereby we start out with a soft PDLF model but switch to the hard PDLF model after a few iterations. Say that this ameliorates the situation to some extent; recommended strategy if possible to implement.

Robustness of PDLF Model:

Next, we consider the various special cases of the PDLF model in equation (4.6) that arise from disregarding the contributions of the covariates, row/column effects, or the interaction effects as listed in Table 5.4. For each of these models, there exists a simpler learning approach that captures the associated structural assumptions. In this experiment, we study the predictive performance of our PDLF algorithm when data is generated from a simpler model. This provides an assessment of robustness and overfitting properties of the PDLF model. Table 5.6 shows the prediction error (mean square error with five-fold cross validation) using different algorithms on data generated from models $M_1$-$M_5$ listed Table 5.4. (Note that it is not fair to compare the log-likelihood or training error since the different algorithms from FIGS. 1 and 2 involve a varying number of parameters.)

From Table 5.6, we observe that for each model, the test error using the PDLF algorithm is comparable to that of the special case algorithm appropriate for the model. This provides evidence of the robustness of the PDLF model. In fact, it shows that the presence of a few irrelevant features does not hurt the performance of the PDLF model and makes it a general tool to analyze dyadic response data.

Case Study 1: Relevance Classification using Logistic Model:

In this study, we explore the benefits of our approach for relevance classification, which involves predicting a binary response (relevant or not) given a pair of objects that can be interpreted as the rows and columns of the response matrix. At least two objectives in conducting this experiment include (a) showing an application of PDLF for binary response and (b) showing that combining covariate information and modeling local structure leads to better predictive performance relative to methods that do not account for both these information simultaneously.

For our experiments, we used a subset of the MovieLens dataset consisting of 459 users, 1410 movies, and 20000 ratings (range 1-5) as well as 23 attributes based on user demographics, movie genres and their interactions. We binarized the response variable by choosing ratings greater than 3 as relevant and ratings less than or equal to 3 as not relevant. To predict this binary-valued response, we consider a PDLF model based on Bernoulli (or logistic) distributions. For scalability, we restrict ourselves to the hard PDLF algorithm (FIG. 2) with a fairly small number of row/column clusters k=l=5. To evaluate this approach, we compare it against two methods that have been previously used to analyze this data: (a) logistic regression which is a supervised learning method that only incorporates covariate effects and (b) cross-association learning which is an unsupervised approach to learn a dyadic matrix consisting of binary response variable for prediction purposes.

TABLE 5.6

Prediction error (mean square error with 5-fold cross validation) using different algorithms on data generated from models $M_1$-$M_5$, k = l = 5 where applicable

| Model | Soft PDLF | Linear Regression | Linear Regression with row/col effects | Co-clustering | Co-clustering with row/col effects |
|---|---|---|---|---|---|
| $M_1$ | 1.1436 ± 0.0047 | 1.1496 ± 0.0046 | 1.1488 ± 0.0050 | 1.1566 ± 0.0049 | 1.1520 ± 0.0043 |
| $M_2$ | 0.7172 ± 0.0030 | 0.7193 ± 0.0030 | 0.7178 ± 0.0030 | 0.7286 ± 0.0030 | 0.7290 ± 0.0032 |
| $M_3$ | 0.7178 ± 0.0034 | 0.7199 ± 0.0029 | 0.7191 ± 0.0029 | 0.7312 ± 0.0029 | 0.7337 ± 0.0032 |
| $M_4$ | 1.1357 ± 0.0050 | 1.1485 ± 0.0045 | 1.1408 ± 0.0048 | 1.1327 ± 0.0048 | 1.1426 ± 0.0049 |
| $M_5$ | 1.1456 ± 0.0044 | 1.1497 ± 0.0047 | 1.1471 ± 0.0049 | 1.1458 ± 0.0046 | 1.1448 ± 0.0048 |

TABLE 5.7

Prediction error (mean square error with 5-fold cross-validation) using different algorithm with partial covariate information. k = l = 5 where applicable.

| Algorithm | Mean Sq. Error |
|---|---|
| Soft PDLF | 0.7175 ± 0.0030 |
| Linear Regression | 0.7221 ± 0.0031 |
| Linear Regression with row/col effects | 0.7332 ± 0.0032 |
| Co-clustering | 0.7252 ± 0.0031 |
| Co-clustering with row/col effects | 0.7316 ± 0.0032 |

FIG. 3 is a diagram that displays precision-recall curves on MovieLens data, in which k=l=5 for both the PDLF and cross-associations learning. Table 5.8 shows the misclassification error and FIG. 3 shows the precision-recall curves obtained using the different methods. We find better performance with PDLF, proving the benefit of simultaneously incorporating both covariate and cluster information for building effective predictive models for dyadic data.

TABLE 5.8

Misclassification error (5-fold cross-validation) on MovieLens data. We choose k = l = 5 for the both PDLF and cross-association learning.

| Baseline | Logistic Regression | Cross Associations | PDLF |
|---|---|---|---|
| 0.44 ± 0.0004 | 0.41 ± 0.0005 | 0.41 ± 0.007 | 0.37 ± 0.005 |

Case Study 2: Imputation of Missing Values using Gaussian Model:

This experiment focuses on the case where the dyadic response is continuous and the learning task can be viewed as predicting missing values in a matrix. We used the same MovieLens dataset as in the first case study. Since most of the existing techniques for addressing this task such as singular value decomposition (SVD), nonnegative matrix factorization (NNMF), and correlation-based methods implicitly assume a Gaussian generative model, we transformed the response, i.e., the rating values using $y_{new}=\sqrt{(6-y)}$ to eliminate the skew and make the distribution more symmetric and close to Gaussian.

To predict this response, we use the hard PDLF algorithm (FIG. 2) for Gaussian distributions with both row and column clusters set to 5; in addition, we used covariates to account for the row and column effects. Table 5.9 shows the mean absolute error in the predictions (after inverse transformation) obtained using PDLF, k-rank SVD (k=5), k-rank NNMF (squared loss, k=5) bias adjusted co-clustering (COCLUST) (scheme $C_5$, squared loss, k=l=5) and simple linear regression (LINREG).

TABLE 5.9

Mean absolute error (5-fold cross-validation) on MovieLens data. We choose k = l = 5 for the both PDLF and co-clustering and k = 5 for SVD and NNMF.

| PDLF | LINREG | COCLUST | SVD | NNMF |
|---|---|---|---|---|
| 0.80 ± 0.006 | 0.81 ± 0.006 | 0.83 ± 0.005 | 0.84 ± 0.004 | 0.83 ± 0.007 |

As in the previous logistic regression example, we find that the PDLF model provides better predictive performance due of its flexibility to discover special clusters that have information not contained in the available covariates. Part of this flexibility includes that the response can be binary valued, integral valued, or real valued because of the GLM base of the algorithm, and because of the algorithm of FIG. 2 as a whole. For example, the PDLF model discovers a cluster containing not-so-well-known movies released in 1930's (shown in Table 5.10) while the co-clustering algorithm( ) without covariates only discovers groups that are predominantly characterized by the genre and rating levels, e.g. classic oscar-winning dramas.

TABLE 5.10

Examples of movie clusters obtained using PDLF and direct co-clustering.

| Movies from the 30's (Sample movie cluster - PDLF) | Oscar winning dramas (Sample movie cluster - COCLUST) |
|---|---|
| Lost Horizon (1937) | Dead Man Walking |
| My Man Godfrey (1936) | Braveheart |
| Gay Divorcee, The (1934) | Dances with Wolves |
| Bride of Frankenstein (1935) | Godfather, The |
| Duck Soup (1933) | Silence of the Lambs, The |

This experiment also demonstrates that other than providing accurate predictions, PDLF discovers clusters that are more informative. It likewise shows that the methods disclosed herein are scalable, creating factorized, grid-like cluster assignments in which a soft model (FIG. 1) lends more accurate results and a hard model (FIG. 2) yields a more scalable result that is computationally less-intensive.

Case Study 3: Feature Discovery using Poisson Model:

This experiment illustrates the utility of the proposed methodology for discovering hidden covariates. Specifically, we consider the task of predicting the number of times an ad served on a web-site is clicked from an ip (or ip-domain), which is useful for monitoring click volume and other related applications. For our experiment, we used a dataset consisting of 47903 ip-domains, 585 web-sites and 125208 ip-website dyads with click-counts and two covariates, ip-location and routing type. Since we deal with count data, we employ a PDLF model based on a Poisson distribution with k=l=5. Similar to the earlier experiment, additional covariates that adjust for row (ip) and column (website) effects are also included. As in the previous two experiments, the predictive performance of the hard PDLF algorithm, measured in this case by I-divergence between observed and predicted (shown in Table 5.13) is better than a straightforward Poisson regression or the information-theoretic co-clustering approach. The clusters from the PDLF algorithm were rigorously analyzed.

Figure 4A:
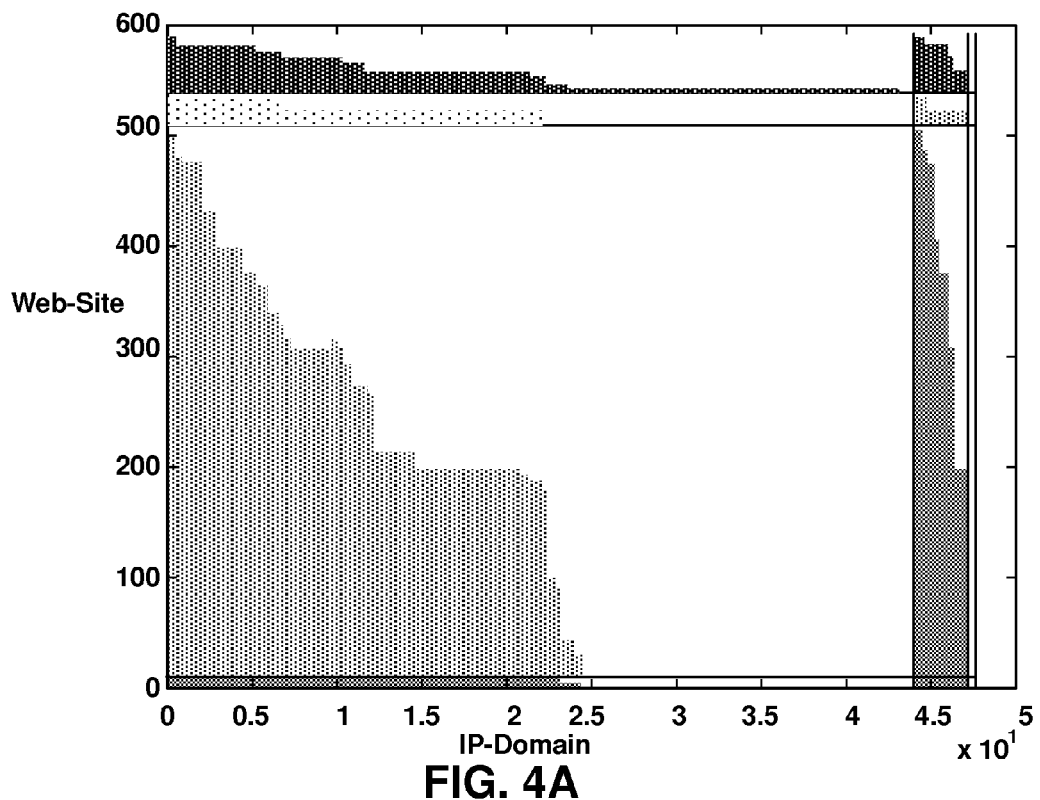
FIGS. 4A and 4B are graphs that display co-clusters from, respectively, co-clustering obtained using direct information-theoretic co-clustering and the hard PDLF algorithm before and after adjusting for the covariates, along with row/column effects.
Figure 4B:
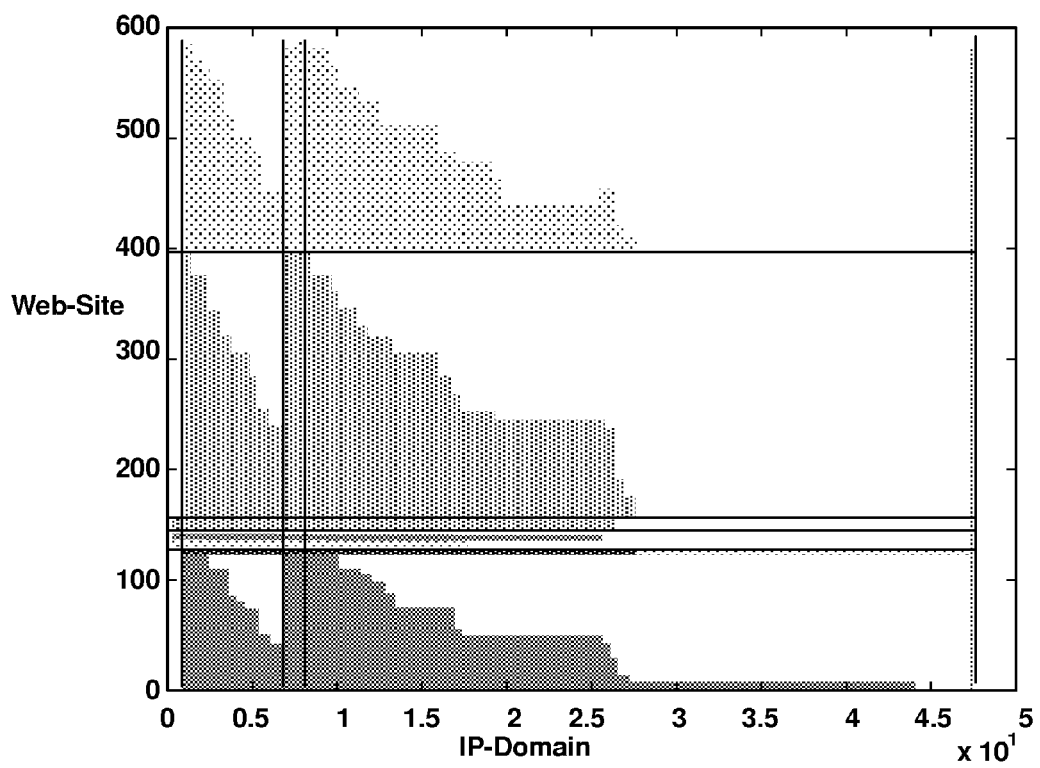
Figure 5A:
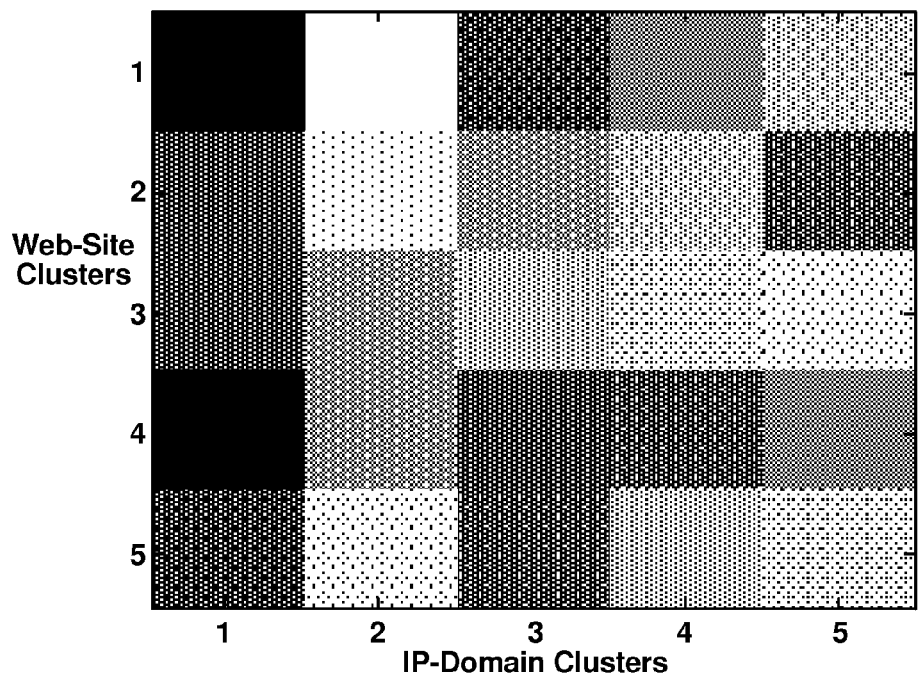
FIGS. 5A and 5B are graphs that display the interaction effects using, respectively, co-clustering obtained using direct information-theoretic co-clustering and the hard PDLF algorithm.
Figure 5B:
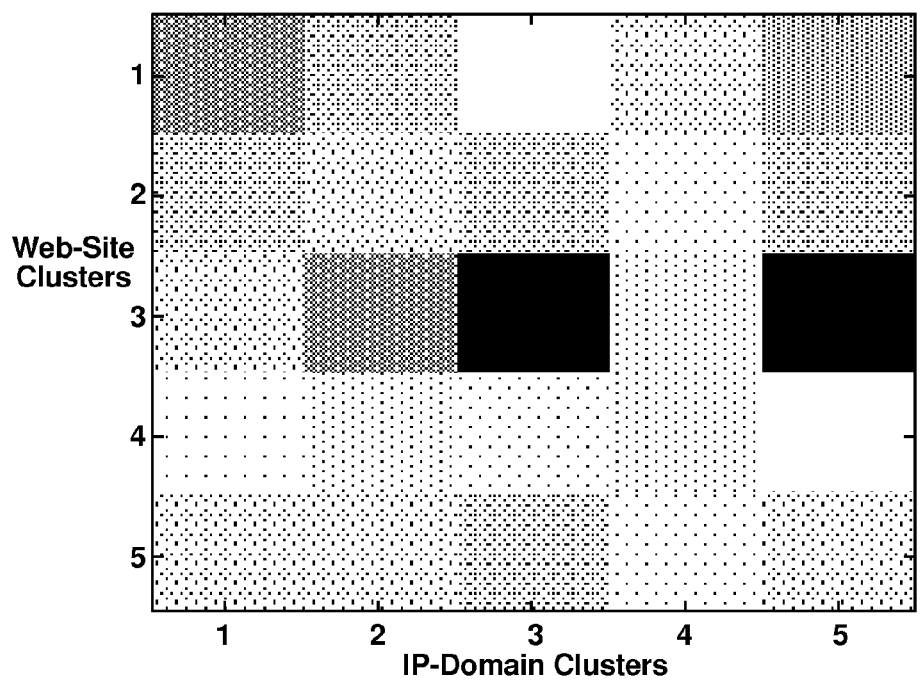

FIG. 4 shows the co-clusters obtained before and after adjusting for the covariates and the row/column effects and the corresponding interaction effects. FIG. 4A shows the results using co-clustering and FIG. 4B shows the results using a hard PDLF algorithm. FIG. 4C shows interaction effects while using co-clustering, and FIG. 4D shows interaction effects with the hard PDLF model, each showing Δ values in which the dark values correspond to strong negative interactions and the light values correspond to strong positive interactions. On examining the first co-clustering, we find that co-clusters (shown in Table 5.11) identify a number of highly predictive factors including the ip-domain location.

TABLE 5.11

Web-site and ip-domain clusters obtained using plain co-clustering

| Cluster Id | Web-site clusters rows | Ip-domain clusters columns |
|---|---|---|
| 1 | shopping/search | Most non-clicking ips/US |
| 2 | popular shopping/search | aol/unkonown/ |
| 3 | aol/yahoo | educational/European |
| 4 | Most websites | Japanese |
| 5 | smaller portals | Korean |

In contrast, the hard PDLF approach reveals co-clusters (shown in Table 5.12) with a different set of interactions. In particular, the ip-domain clusters are no longer correlated with location and identify other interesting characteristics such as whether an ip-domain is a telecom company (column cluster 5) or a software/tech company (column cluster 3), which respectively happen to have positive interactions with internet portals (row cluster 4) and web media (row cluster 1).

TABLE 5.12

Examples from web-site and ip-domain clusters obtained using PDLF.

| Cluster | Characteristic | Examples |
|---|---|---|
| Web-site cluster 1 | Web Media | usatoday, newsgroups |
| Web-site cluster 4 | Online Portals | msn, yahoo |
| Ip-domain cluster 3 | Tech companies | agilent.com, intel.com |
| Ip-domain cluster 5 | Telecom companies | sbcglobal.net, comcastbusiness.net |

From the "Hard Assignment PDLF Model" section, we observe that the newly identified co-clusters can, in fact, be treated as new covariates allowing us to perform feature selection to obtain a model which generalize better. Table 5.13 (last column) shows that the predictive accuracy improves slightly after we eliminate some of the co-cluster based covariates.

We point out the proposed algorithm is fairly efficient and can execute a single run of the algorithm (30 iterations) on this moderate-sized dataset in about 40s in Matlab on a 1.86 GHz Pentium M with 1 GB RAM.

TABLE 5.13

I-divergence loss (5-fold cross-validation) on click-count dataset. We choose k = l = 5 for the both PDLF and co-clustering.

| PDLF | Linear Regression | COCLUST | PDLF with feature selection |
|---|---|---|---|
| 54.09 ± 6.76 | 72.21 ± 0.94 | 77.72 ± 7.65 | 52.12 ± 2.44 |

To summarize, herein are provided sanity checks and a comparative analysis of soft and hard versions of PDLF through large scale simulations. Shown are both versions of the algorithm perform well with the hard version having a tendency to slightly overfit. We also show that the PDLF model is robust in cases where a few covariates are not predictive and/or there is no local structure present in the data.

We conduct experiments on a publicly available Movie-Lens dataset using a logistic and Gaussian response model. We compare the PDLF model with existing supervised and unsupervised approaches that have been used to analyze this data and find superior performance. We also show that the clusters obtained from the PDLF model after adjusting for covariate effects are more informative. Finally, we conduct co-clustering analysis on a new real world dataset that is obtained from an application in internet advertising. The response variable in this case are click counts, hence we demonstrate PDLF on a Poisson model. This experiment is conducted on a much larger dataset and demonstrates the scalability of the PDLF model. Here again, simultaneous inclusion of both covariates and latent factors provides a better performance relative to cases which do not include both. In fact, the cluster obtained for this experiment after adjusting for covariates are much more informative; the ones obtained without adjusting for covariates contain redundant information.

Further applications of the PDLF model and associated algorithms, although not discussed in detail, include the following non-exhaustive list of examples. (1) Web Goods or Services or related applications in which the dyads are consumers and goods/services, and wherein a preference rating of a consumer for a good/service is predicted. Possible covariates include user demographics, and good/service characteristics such a content, price, etc. (2) Web Search or related applications in which the dyads are web pages and queries, and wherein the relevance ranking of the web page for the query is predicted. Possible covariates include web page rank, page-query similarity, query frequency, ect. (3) Content Match or related applications in which the dyads are web pages and ads, and wherein the click-through probability of a specific ad on a specific web page is predicted. Possible covariates include page-ad content match, page host trust score, etc. (4) Sponsored Search or related applications in which the dyads are queries and ads, wherein the click-through probability of an ad for a specific query is predicted. Possible covariates include query-ad content match, query user profile, etc. (5) Click Conversion Modeling or related applications in which the dyads are business partner hosts and advertiser keywords, wherein the rates of conversion for clicks from websites of partner hosts are predicted. Possible covariates include partner trust score, partner-keyword-content match, keyword pay-per-click cost, partner spam score, etc.

Accordingly, one of skill in the art will appreciate the almost endless scenarios in which the PDLF model may be employed to fill in the gaps of large scale dyadic data to predict local structure or latent factors of interest. The above-listed examples should not constrain the scope of the disclosure to such possibilities, as any number of dyads and covariates are conceivable and within the scope of this disclosure. The discovered factors and/or structure provide a predictive model that is both accurate and interpretable. Furthermore, scenarios in which the sets of data elements include three or more sets, such as tuples, and in which the methods taught herein are easily applied and/or extrapolated to such larger sets of data.

To summarize overall, disclosed is a fairly general and scalable predictive modeling methodology for large, sparse, dyadic data that simultaneously combines information from the available covariates and discovers local structure by using a statistical model-based approach that combines ideas from supervised and unsupervised learning. We prove the efficacy of the approach through simulation, analysis on a publicly available dataset and a new dataset in the domain of internet advertising. We find better predictive performance relative to simpler models and other existing approaches; we also demonstrate the interpretability of our approach by discovering meaningful clusters in our example datasets. The hard PDLF approach, although scalable and fairly accurate in practice, showed signs of overfitting in our simulation experiments.

Various modifications, changes, and variations apparent to those of skill in the art may be made in the arrangement, operation, and details of the methods and systems disclosed. The embodiments may include various steps, which may be embodied in machine-executable instructions to be executed by a general-purpose or special-purpose computer (or other electronic device). Alternatively, the steps may be performed by hardware components that contain specific logic for performing the steps, or by any combination of hardware, software, and/or firmware. Embodiments may also be provided as a computer program product including a machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, propagation media or other type of media/machine-readable medium suitable for storing electronic instructions. For example, instructions for performing described processes may be transferred from a remote computer (e.g., a server) to a requesting computer (e.g., a client) by way of data signals embodied in a carrier wave or other propagation medium via a communication link (e.g., network connection).

What is claimed is:

1. A method for predicting a future response from a large set of dyadic data, the method executable by a computer having a processor and memory, the method comprising:
measuring, with the computer, a dyadic response variable associated with a dyad from two different sets of data that define a dyadic space;
measuring, with the computer, a vector of covariates that captures the characteristics of the dyad; and
modeling, with the computer, a predictive response based on the measurements to more accurately predict future dyadic interaction based on the two different sets of data by:
(a) casting the dyadic response variable as a matrix including pre-specified covariates from the vector of covariates;
(b) detrending the response variable by performing a co-clustering, or regressing, on the pre-specified covariates to generate residuals that are unexplained;
(c) when the response variable is detrended by regression in (b), extracting from the residuals in (b) latent characteristics that induce local structures in the dyadic space by conducting co-clustering on the residuals to determine co-cluster means, else regressing residuals in (b) on the pre-specified covariates: and
(d) iteratively performing steps (b) and (c) until arriving at a predictive response that is a composition of optimal regression and co-clusterinq that adequately explains the local structures.

2. The method of claim 1, wherein the dyad comprises users and at least one of a good and a service, and wherein the response variable comprises a preference rating of consumers for the at least one good and service.

3. The method of claim 1, wherein the dyad comprises web pages and queries, and wherein modeling a predictive response comprises predicting a relevance ranking of a web page for a query.

4. The method of claim 1, wherein the dyad comprises web pages and advertisements, and wherein modeling a predictive response comprises predicting a click-through probability of a specific advertisement located on a specific web page.

5. The method of claim 1, wherein the dyad comprises queries and advertisements, and wherein modeling a predictive response comprises predicting a click-through probability for an advertisement for a specific query.

6. The method of claim 1, wherein the dyad comprises partner hosts and keyword search terms, and wherein modeling a predictive response comprises predicting a rate of conversion for clicks on the keywords from a website of a partner host.

7. The method of claim 1, wherein modeling the response of the measurements as a function of the covariates comprises employing a generalized linear model (GLM) of the vectors of covariates, wherein the predictive response comprises at least one of a binary value, an integral value, and a real value.

8. The method of claim 1, wherein casting the dyadic response variable as a matrix comprises forming $Y=[y_{ij}] \in \Re^{m \times n}$, which denotes a measurement response matrix and $X=[x_{ij}] \in \Re^{m \times n \times s}$, which denotes a tensor corresponding to s pre-specified covariates with $x_{ij} \in \Re^s$, and $w=[w_{ij}] \in \Re^{m \times n}$ which denotes non-negative weights associated with observations in Y.

9. The method of claim 8, wherein the dyads are represented by (i, j) and the response matrix comprises k×l blocks (I, J) with prior probabilities $\pi_{I,J}$, and wherein a conditional predictive discrete latent factor model (PDLF) distribution of the predictive response comprises:

$$p(y_{ij} \mid x_{ij}) = \sum_{I,J} \pi_{I,J} f_\psi(y_{ij}, \beta^t x_{ij} + \delta_{I,J}), \ [i]_1^m [j]_1^n. \qquad (A)$$

10. The method of claim 9, further comprising:
fitting the response model in equation A to the sets of data through a generalized expectation-maximization (EM) algorithm.

11. The method of claim 10, wherein modeling a predictive response allows a factorized, grid-like cluster assignment of the measurement response matrix comprising at least one of soft and hard assignments.

12. The method of claim 1, further comprising, before (d) where the response variable is detrended by regression in (b):
(e) constructing a new set of residuals by detrending the response variable with the co-cluster means in (c);
(f) adjusting interpreted interactions of the pre-specified covariates by conducting regression of the residuals in (e); and
(g) iteratively performing steps (b), (c), (e), and (f) until arriving at the predictive response.

13. A method for predicting a future response from a large set of dyadic data, the method executable by a computer having a processor and memory, the method comprising:
measuring, with the computer, a dyadic response variable associated with a dyad from two different sets of data;
measuring, with the computer, a vector of covariates that captures characteristics of the dyad;
learning, with the computer, latent, unmeasured characteristics that are not determined by the vector of covariates and which induce local structures in a dyadic space defined by the two different sets of data;
modeling, with the computer, a predictive response of the measurements as a function of both the vectors of covariates and the latent characteristics to more accurately predict future dyadic interaction based on the two different sets of data by:
employing co-clustering of latent characteristics with the vector of covariates to generate a response matrix having rows and columns, each row or column being exclusively assigned to a single latent characteristic; and wherein learning comprises:

determining a most informative set of latent covariates of a specific form of disjointed blocks of the response matrix that most accurately produces the modeled predictive response; and fitting a general linear model (GLM) over a combination of covariates in an initial set of covariates, $X \in \Re^{m \times n \times s}$, and latent covariates, $X^{latent} \in \Re^{m \times n \times k l}$ associated with k×l co-clusters.

14. The method of claim 13, wherein the dyad comprises consumers and at least one of a good and a service, and wherein modeling a predictive response comprises predicting a preference rating of the consumer for the at least one good and service.

15. The method of claim 13, wherein the dyad comprises web pages and queries, and wherein modeling a predictive response comprises predicting a relevance ranking of a web page for a query.

16. The method of claim 13, wherein the dyad comprises web pages and advertisements, and wherein modeling a predictive response comprises predicting a click-through probability of a specific advertisement located on a specific web page.

17. The method of claim 13, wherein the dyad comprises queries and advertisements, and wherein modeling a predictive response comprises predicting a click-through probability for an advertisement for a specific query.

18. The method of claim 13, wherein using co-clustering comprises mapping rows and columns of the covariate matrix to rows and columns of latent characteristics, respectively, and wherein the specific form comprises at least one of binary-valued, integral-valued, and real-valued indicators.

19. The method of claim 13, wherein modeling a predictive response allows a factorized, grid-like cluster assignment of the response matrix.

20. The method of claim 13, wherein a predictive discrete latent factor model (PDLF) distribution of the predictive response comprises:

$$P(Y_{ij}|x_{ij}, \rho, \gamma) = f_\psi(y_{ij}; \beta^t x_{ij} + \delta_{\rho(i), \gamma(j)}), [i]_1^m [j]_1^n, \quad (B)$$

where the $ij^{th}$ element is assigned exclusively to the block $(\rho(i), \gamma(j))$.

21. The method of claim 20, wherein for each block (i, j), the method comprising:

indicating $X_{ij}^{latentI,J}$ denotes a binary-valued covariate that indicates if the dyad belongs to the $IJ^{th}$ block; and recasting the modeled predictive response as:

$$p(X_{ij}|X_{ij}^{latent}) = f_\psi(y_{ij}; \beta^t X_{ij} = \Delta^t X_{ij}^{latent}), [i]_1^m [j]_1^n, \quad (C)$$

with β being the coefficients of the covariates $X^{latent}$.

22. A method for predicting a future response from a large set of dyadic data, the method executable by a computer having a processor and memory, the method comprising:

measuring, with the computer, a dyadic response variable associated with a dyad from two different sets of data;

measuring, with the computer, a vector of covariates that captures the characteristics of the dyad;

learning, with the computer, latent, unmeasured characteristics that are not determined by the vector of covariates and which induce local structures in a dyadic space defined by the two different sets of data;

modeling, with the computer, a predictive response of the measurements as a function of both the vectors of covariates and the latent characteristics to more accurately predict future dyadic interaction based on the two different sets of data by:

employing co-clustering of latent characteristics with the vector of covariates to generate a response matrix having rows and columns, each row or column being exclusively assigned to a single latent characteristic; and wherein learning comprises:

determining a most informative set of latent covariates of a specific form of disjointed blocks of the response matrix that most accurately produces the modeled predictive response; and performing feature selection over the newly identified set of covariates to obtain a predictive model that allows better generalization.

23. The method of claim 22, wherein learning further comprises fitting a general linear model (GLM) over a combination of covariates in an initial set of covariate, $X \in \Re^{m \times n \times s}$, and latent covariates, $X^{latent} \in \Re^{m \times n \times k l}$, associated with k×I co-clusters.

24. The method of claim 22, wherein the dyad comprises consumers and at least one of a good and a service, and wherein the set of latent covariates includes at least one of a consumer demographic and characteristics of the at least one good and service.

25. The method of claim 22, wherein the dyad comprises web pages and queries, and wherein the set of latent covariates includes at least one of web page rank, page-query similarity, and query frequency.

26. The method of claim 22, wherein the dyad comprises web pages and advertisements, and wherein the set of latent covariates includes at least one of page-ad content match and a page host trust score.

* * * * *